United States Patent
Yang et al.

(10) Patent No.: US 12,299,274 B2
(45) Date of Patent: May 13, 2025

(54) DISPLAY DEVICE AND DISPLAY METHOD FOR MENU BAR THEREOF

(71) Applicants: Beijing BOE Technology Development Co., Ltd., Beijing (CN); BOE Technology Group Co., Ltd., Beijing (CN)

(72) Inventors: Yan Yang, Beijing (CN); Mingyue Wang, Beijing (CN)

(73) Assignees: Beijing BOE Technology Development Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 18/293,301

(22) PCT Filed: Sep. 28, 2021

(86) PCT No.: PCT/CN2021/121400
§ 371 (c)(1),
(2) Date: Jan. 29, 2024

(87) PCT Pub. No.: WO2023/050079
PCT Pub. Date: Apr. 6, 2023

(65) Prior Publication Data
US 2024/0338121 A1    Oct. 10, 2024

(51) Int. Cl.
*G06F 3/04883* (2022.01)
*G06F 3/0354* (2013.01)
(Continued)

(52) U.S. Cl.
CPC ...... *G06F 3/04883* (2013.01); *G06F 3/03545* (2013.01); *G06F 3/0482* (2013.01); *G06F 3/0484* (2013.01)

(58) Field of Classification Search
CPC .. G06F 3/04883; G06F 3/0545; G06F 3/0482; G06F 3/0484
See application file for complete search history.

(56) References Cited

U.S. PATENT DOCUMENTS 9,367,234 B2 * 6/2016 Bang ............... G06F 3/04812
11,599,247 B2 * 3/2023 Yao ................. G06F 3/03545
(Continued)

FOREIGN PATENT DOCUMENTS

CN    101984397 A    3/2011
CN    103092412 A    5/2013
(Continued)

OTHER PUBLICATIONS

Li et al., CN 106445378 A machine translation (Year: 2016).*
(Continued)

*Primary Examiner* — Peter D McLoone
(74) *Attorney, Agent, or Firm* — IPro, PLLC

(57) ABSTRACT

A display device includes a display screen and a control circuit. The display screen is configured to display content. The control circuit includes a processor and a memory. The memory is configured to store a program executable by the processor. The processor is configured to read the program in the memory and perform the following steps: in response to a touch instruction generated by at least one user, determining, according to the touch position of the touch instruction, a display position of a first menu bar corresponding to the touch instruction, the display position changing with the movement of the touch position; and displaying the first menu bar corresponding to the touch instruction at the display position.

17 Claims, 9 Drawing Sheets

(51) Int. Cl.
  *G06F 3/0482*   (2013.01)
  *G06F 3/0484*   (2022.01)

(56) References Cited

U.S. PATENT DOCUMENTS

2009/0019385 A1\* 1/2009 Khatib ................ G06F 3/04817
                                                     715/765
2010/0306650 A1   12/2010 Oh et al.

FOREIGN PATENT DOCUMENTS

| CN | 103309558 A | 9/2013 |
| CN | 106445378 A | 2/2017 |
| CN | 107015735 A | 8/2017 |
| CN | 111414108 A | 7/2020 |
| CN | 111901646 A | 11/2020 |

OTHER PUBLICATIONS

Ruxi et al., CN 101984397 B machine translation (Year: 2010).\*
Yu, CN 111414108 A machine translation (Year: 2020).\*
PCT/CN2021/121400 international search report dated May 25, 2022.

\* cited by examiner

DISPLAY DEVICE AND DISPLAY METHOD FOR MENU BAR THEREOF

CROSS REFERENCE TO RELATED APPLICATION

The present disclosure is a National Stage of International Application No. PCT/CN2021/121400, filed Sep. 28, 2021, the entire contents of which are incorporated herein by reference.

TECHNICAL FIELD

The present disclosure relates to the technical field of smart conferences, and in particular to a display device and a display method for a menu bar thereof.

BACKGROUND

With the continuous development of the times and the continuous progress of science and technology, the traditional conference mode is no longer suitable for requirements of the modern office. Therefore, the smart conference is put forward. In the scenario of smart conference, it is generally necessary to use a large-size (generally more than 50 inches) display device and use the touch function of the display device with a stylus to perform touch operations, for example, to perform writing operations through the stylus and perform writing setting through a menu bar corresponding to the stylus.

However, at present, in the process of touch operation, a display position of the menu bar corresponding to the stylus on the display device is fixed. For example, the menu bar is displayed at a lower right corner of a display screen of the display device. Due to the large size of display device in the current conference scenario, a user needs to move to the fixed display position of the menu bar every time the user needs to operate a menu in the menu bar. Therefore, in the conference scenario based on the large-size display device, the user needs to move back and forth to operate the menu in the menu bar, reducing the convenience of using the menu bar, and the user's conference experience is poor.

SUMMARY

The present disclosure provides a display device and a display method for a menu bar thereof, for improving the convenience of using the menu bar in a conference scenario of a large-size display device, and improving the user's conference experience.

In a first aspect, embodiments of the present disclosure provide a display device, including a display screen and a control circuit, where:
the display screen is configured to display content;
the control circuit includes a processor and a memory, the memory is configured to store a program executable by the processor, the processor is configured to read the program in the memory and perform following steps:
in response to a touch instruction generated by at least one user, determining a display position of a first menu bar corresponding to the touch instruction according to a touch position of the touch instruction, where the display position changes with movement of the touch position;
displaying the first menu bar corresponding to the touch instruction at the display position.

As optional embodiments, display content is generated according to the touch instruction. The first menu bar is used for editing the display content.

As optional embodiments, the touch instruction includes a writing instruction, and the display content includes a writing trajectory.

As optional embodiments, the processor is configured to perform:
determining a region where the touch position of the touch instruction is located from a plurality of regions divided for the display screen of the display device;
determining the display position of the first menu bar corresponding to the touch instruction in the region where the touch position is located.

As optional embodiments, the processor is configured to perform:
determining the touch position of the touch instruction on the display screen of the display device;
determining the display position of the first menu bar of a stylus within a preset range centering on the touch position.

As optional embodiments, the processor is configured to perform:
displaying a second menu bar;
controlling the first menu bar and the second menu bar to be combined into one menu bar within at least one set range centering on the touch position.

As optional embodiments, before determining the display position of the first menu bar corresponding to the touch instruction according to the touch position of the touch instruction, the processor is configured to perform:
in response to an activation instruction generated by at least one user, determining an initial display position of a first menu bar corresponding to the activation instruction according to an activation position corresponding to the activation instruction;
displaying the first menu bar corresponding to the activation instruction at the initial display position.

As optional embodiments, the activation instruction includes an instruction generated when the user removes a stylus from the display device.

As optional embodiments, an outer side of the display device includes at least two positions for placing styluses;
where the processor is configured to perform:
determining the activation position corresponding to the activation instruction to be one of the at least two positions for placing the styluses;
determining the initial display position of the first menu bar in a region at a side of the display screen of the display device adjacent to the activation position.

As optional embodiments, the activation instruction includes an instruction generated when a finger of the user contacts the display screen of the display device and received for a first time after startup of the display device.

As optional embodiments, the processor is configured to perform:
determining the activation position corresponding to the activation instruction to be a position on the display screen of the display device;
determining the initial display position of the first menu bar in a region of the display screen comprising the activation position, wherein the display screen comprises a plurality of divided regions.

As optional embodiments, the processor is configured to perform:

generating a plurality of first menu bars, the plurality of first menu bars being located at different positions of the display screen.

As optional embodiments, the processor is configured to perform:
generating a plurality of first menu bars when a plurality of touch instructions are detected.

As optional embodiments, the processor is configured to determine detection of a plurality of touch instructions by:
determining a difference in detection time between adjacent touch instructions in terms of detection time, and a distance between touch positions of the adjacent touch instructions;
when the difference is less than a time threshold and the distance is greater than a distance threshold, determining that a plurality of touch instructions are detected.

As optional embodiments, the processor is configured to determine detection of a plurality of touch instructions by:
determining a distance between touch positions of touch instructions detected simultaneously;
when the distance is greater than a distance threshold, determining that a plurality of touch commands are detected.

As optional embodiments, after displaying the first menu bar corresponding to the touch instruction at the display position, the processor is configured to perform:
when the touch instruction is not detected again within a preset time period after the touch instruction is detected, controlling the first menu bar corresponding to the touch instruction to disappear from the display screen; or
when a difference in detection time between adjacent touch instructions is larger than a preset value, controlling the first menu bar corresponding to the touch instruction with earlier detection time to disappear from the display screen; or
when a return instruction generated when a stylus is placed back on the display device is detected, controlling the first menu bar corresponding to the touch instruction generated by the stylus to disappear from the display screen.

As optional embodiments, the first menu bar includes at least one icon and an extension icon, and the extension icon is used for displaying icons in the first menu bar after receiving an expansion instruction.

In a second aspect, embodiments of the present disclosure provides a display method for a menu bar, including:
in response to a touch instruction generated by at least one user, determining a display position of a first menu bar corresponding to the touch instruction according to a touch position of the touch instruction, wherein the display position changes with movement of the touch position;
displaying the first menu bar corresponding to the touch instruction at the display position.

As optional embodiments, the method further includes:
generating display content according to the touch instruction, wherein the first menu bar is used for editing the display content.

As optional embodiments, the touch instruction includes a writing instruction, and the display content includes a writing trajectory.

As optional embodiments, determining the display position of the first menu bar corresponding to the touch instruction according to the touch position of the touch instruction includes:

determining a region where the touch position of the touch instruction is located from a plurality of regions divided for a display screen of a display device;
determining the display position of the first menu bar corresponding to the touch instruction in the region where the touch position is located.

As optional embodiments, determining the display position of the first menu bar corresponding to the touch instruction according to the touch position of the touch instruction includes:
determining the touch position of the touch instruction on a display screen of a display device;
determining the display position of the first menu bar of a stylus within a preset range centering on the touch position.

As optional embodiments, the method further includes:
displaying a second menu bar;
controlling the first menu bar and the second menu bar to be combined into one menu bar within at least one set range centering on the touch position.

As optional embodiments, before determining the display position of the first menu bar corresponding to the touch instruction according to the touch position of the touch instruction, the method further includes:
in response to an activation instruction generated by at least one user, determining an initial display position of a first menu bar corresponding to the activation instruction according to an activation position corresponding to the activation instruction;
displaying the first menu bar corresponding to the activation instruction at the initial display position.

As optional embodiments, the activation instruction includes an instruction generated when the user removes a stylus from the display device.

As optional embodiments, an outer side of the display device includes at least two positions for placing styluses; determining the initial display position of the first menu bar corresponding to the activation instruction according to the activation position corresponding to the activation instruction includes:
determining the activation position corresponding to the activation instruction to be one of the at least two positions for placing the styluses;
determining the initial display position of the first menu bar in a region at a side of the display screen of the display device adjacent to the activation position.

As optional embodiments, the activation instruction includes an instruction generated when a finger of the user contacts the display screen of the display device and received for a first time after startup.

As optional embodiments, determining the initial display position of the first menu bar corresponding to the activation instruction according to the activation position corresponding to the activation instruction includes:
determining the activation position corresponding to the activation instruction to be a position on the display screen of the display device;
determining the initial display position of the first menu bar in a region of the display screen including the activation position, where the display screen includes a plurality of divided regions.

As optional embodiments, the method further includes:
generating a plurality of first menu bars, the plurality of first menu bars being located at different positions of the display screen.

As optional embodiments, the method further includes:

generating a plurality of first menu bars when a plurality of touch instructions are detected.

As optional embodiments, detection of a plurality of touch instructions is determined by:
  determining a difference in detection time between adjacent touch instructions in terms of detection time, and a distance between touch positions of the adjacent touch instructions;
  when the difference is less than a time threshold and the distance is greater than a distance threshold, determining that a plurality of touch instructions are detected.

As optional embodiments, detection of a plurality of touch instructions is determined by:
  determining a distance between touch positions of touch instructions detected simultaneously;
  when the distance is greater than a distance threshold, determining that a plurality of touch commands are detected.
  an optional embodiments, after displaying the first menu bar corresponding to the touch instruction at the display position, the method further includes:
  when the touch instruction is not detected again within a preset time period after the touch instruction is detected, controlling the first menu bar corresponding to the touch instruction to disappear from the display screen; or
  when a difference in detection time between adjacent touch instructions is larger than a preset value, controlling the first menu bar corresponding to the touch instruction with earlier detection time to disappear from the display screen; or
  when a return instruction generated when a stylus is placed back on the display device is detected, controlling the first menu bar corresponding to the touch instruction generated by the stylus to disappear from the display screen.

As optional embodiments, the displayed first menu bar includes at least one icon and an extension icon, and the extension icon is used for displaying icons in the first menu bar after receiving an expansion instruction.

In a third aspect, embodiments of the present disclosure provides a display apparatus for a menu bar, including:
  a position determining unit, configured to in response to a touch instruction generated by at least one user, determine a display position of a first menu bar corresponding to the touch instruction, where the display position changes with movement of the touch position;
  a menu display unit, configured to display the first menu bar corresponding to the touch instruction at the display position.

As optional embodiments, the apparatus further includes a content display unit configured to:
  generate display content according to the touch instruction, where the first menu bar is used for editing the display content.

As optional embodiments, the touch instruction includes a writing instruction, and the display content includes a writing trajectory.

As optional embodiments, the position determining unit is configured to:
  determine a region where the touch position of the touch instruction is located from a plurality of regions divided for a display screen of a display device;
  determine the display position of the first menu bar corresponding to the touch instruction in the region where the touch position is located.

As optional embodiments, the position determining unit is configured to:
  determine the touch position of the touch instruction on a display screen of a display device;
  determine the display position of the first menu bar of a stylus within a preset range centering on the touch position.

As optional embodiments, the apparatus further includes a combination display unit configured to:
  display a second menu bar;
  control the first menu bar and the second menu bar to be combined into one menu bar within at least one set range centering on the touch position.

As optional embodiments, before determining the display position of the first menu bar corresponding to the touch instruction according to the touch position of the touch instruction, the apparatus further includes an activation display unit configured to:
  in response to an activation instruction generated by at least one user, determine an initial display position of a first menu bar corresponding to the activation instruction according to an activation position corresponding to the activation instruction;
  display the first menu bar corresponding to the activation instruction at the initial display position.

As optional embodiments, the activation instruction includes an instruction generated when the user removes a stylus from the display device.
  an optional embodiments, an outer side of the display device includes at least two positions for placing styluses; the activation display unit is configured to:
  determine the activation position corresponding to the activation instruction to be one of the at least two positions for placing the styluses;
  determine the initial display position of the first menu bar in a region at a side of the display screen of the display device adjacent to the activation position.

As optional embodiments, the activation instruction includes an instruction generated when a finger of the user contacts the display screen of the display device and received for a first time after startup.

As optional embodiments, the activation display unit is configured to:
  determine the activation position corresponding to the activation instruction to be a position on the display screen of the display device; determine the initial display position of the first menu bar in a region of the display screen including the activation position, where the display screen includes a plurality of divided regions.

As optional embodiments, the position determining unit is configured to: generate a plurality of first menu bars, the plurality of first menu bars being located at different positions of the display screen.

As optional embodiments, the position determining unit is configured to:
  generate a plurality of first menu bars when a plurality of touch instructions are detected.

As optional embodiments, the position determining unit is configured to determine detection of a plurality of touch instructions by:
  determining a difference in detection time between adjacent touch instructions in terms of detection time, and a distance between touch positions of the adjacent touch instructions;

when the difference is less than a time threshold and the distance is greater than a distance threshold, determining that a plurality of touch instructions are detected.

As optional embodiments, the position determining unit is configured to determine detection of a plurality of touch instructions by:

determining a distance between touch positions of touch instructions detected simultaneously;

when the distance is greater than a distance threshold, determining that a plurality of touch commands are detected.

As optional embodiments, after displaying the first menu bar corresponding to the touch instruction at the display position, the apparatus further includes a disappearance control unit configured to:

when the touch instruction is not detected again within a preset time period after the touch instruction is detected, control the first menu bar corresponding to the touch instruction to disappear from the display screen; or when a difference in detection time between adjacent touch instructions is larger than a preset value, control the first menu bar corresponding to the touch instruction with earlier detection time to disappear from the display screen; or when a return instruction generated when a stylus is placed back on the display device is detected, control the first menu bar corresponding to the touch instruction generated by the stylus to disappear from the display screen.

As optional embodiments, the displayed first menu bar includes at least one icon and an extension icon, and the extension icon is used for displaying icons in the first menu bar after receiving an expansion instruction.

In a fourth aspect, embodiments of the present disclosure further provide a computer storage medium storing a computer program thereon, the computer program, when executed by a processor, implementing steps of the method of the first aspect above.

These and other aspects of the present application will be more readily apparent in the following description of embodiments.

BRIEF DESCRIPTION OF FIGURES

In order to illustrate technical solutions in embodiments of the present disclosure more clearly, accompanying drawings that need to be used in describing embodiments of the present disclosure will be introduced below briefly. Obviously the accompanying drawings described below are only some embodiments of the present disclosure, and other accompanying drawings can also be obtained by those ordinary skilled in the art according to these accompanying drawings without creative labor.

DETAILED DESCRIPTION

Figure 1:
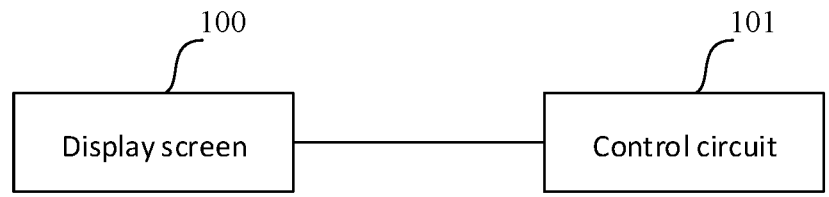
FIG. 1 is a schematic diagram of a display device according to an embodiment of the present disclosure.

In order to make objects, technical solutions and advantages of the present disclosure more clear, the present disclosure will be described in further detail below with reference to accompanying drawing. Obviously, the described embodiments are only a portion of embodiments of the present disclosure, but are not all embodiments. Based on embodiments in the present disclosure, all other embodiment obtained by the skilled in the art without creative effort fall within the scope of the present disclosure.

In embodiments of the present disclosure, the term "and/or" describes an association relationship between associated objects, indicating that there may be three relationships, for example, A and/or B can represent three cases: A exists alone, A and B exist simultaneously, and B exists alone. The character "/" generally indicates that an association relationship between the associated objects before and after the character is an "or" relationship.

Application scenarios described in embodiments of the present disclosure are intended to more clearly illustrate technical solutions of embodiments of the present disclosure, but do not constitute a limitation to technical solutions according to embodiments of the present disclosure. The skilled in the art will know that, with the emergence of new application scenarios, the technical solutions according to embodiments of the present disclosure are also applicable to similar technical problems. In the description of the present disclosure, "a plurality" means two or more unless otherwise specified.

In the scenario of smart conference, it is generally necessary to use a large-size (generally more than 50 inches) display device and use the touch function of the display device with a stylus to perform touch operations, for example, to perform writing operations through the stylus and perform writing setting through a menu bar corresponding to the stylus. However, at present, in the process of touch operation, a display position of the menu bar corresponding to the stylus on the display device is fixed. For example, the menu bar is displayed at a lower right corner of a display screen of the display device. Due to the large size of display device in the current conference scenario, a user needs to move to the fixed display position of the menu bar every time the user needs to operate a menu in the menu bar. Therefore, in the conference scenario based on the large-size display device, the user needs to move back and forth to operate the menu in the menu bar, reducing the convenience of using the menu bar, and the user's conference experience is poor.

The display device in the embodiments of the present disclosure is a large-size (generally more than 50 inches) display device, is configured with a touch function, and is a device that can be used with a stylus for touch operations, such as writing operations, chart drawing operations, etc. Writing programs such as an electronic whiteboard may also be installed on the display device. A user may write on the display device using a finger, an active pen, a passive pen, etc. The display device may include a Liquid Crystal Display (LCD), an organic light-emitting semiconductor (Organic Electroluminescence Display, OLED), an electronic ink and other display modules, and can display handwriting in real time.

In order to solve the technical problem of decreased convenience of using the menu bar due to the fixed display position of the menu in the current smart conference scenario, embodiments of the present disclosure provide a display method of a menu bar. The display position of the menu bar can be changed according to the movement of a touch instruction. In the scenario of using a large-size display device for a smart conference, it is convenient for the user to operate the menu bar nearby during the writing process without moving back and forth to the fixed position, saving conference time and improving conference efficiency.

The core idea of the display method of the menu bar according to embodiments of the present disclosure is that, the display position of the menu bar is determined according to the touch position of the touch instruction detected by the display device, and considering operation requirements of a user, under the condition that the normal writing of the user is not affected as much as possible, the displayed menu bar is set to be able to change with the movement of the touch position. Therefore, when the user moves a large distance from the initial writing position in the writing process, there is no need to return to the initial writing position or a fixed position to operate the menu bar; instead, the menu bar will be displayed near the current touch position. Therefore, the situation that the user repeatedly moves back and forth to operate the menu bar can be effectively reduced, and the conference efficiency is improved.

As shown in FIG. 1, FIG. 1 is a schematic diagram of a display device according to an embodiment. The display device includes a display screen 100 and a control circuit 101.

The display screen is configured to display content.

The control circuit includes a processor and a memory. The memory is configured to store a program executable by the processor. The processor is configured to read the program in the memory and perform following steps:

in response to a touch instruction generated by at least one user, determining a display position of a first menu bar corresponding to the touch instruction according to a touch position of the touch instruction, where the display position changes with movement of the touch position;

displaying the first menu bar corresponding to the touch instruction at the display position.

In implementations, after the display device detects touch instruction(s) generated by one or more users, the touch position(s) of the touch instruction(s) generated by the user(s) is/are first determined. The touch instruction includes, but is not limited to, a writing instruction. Display content includes, but is not limited to, a writing trajectory. The touch position of the touch instruction can be understood as the position where the touch instruction is generated. It should be noted that the touch instruction generated by each user can be an instruction generated by a writing trajectory, which is a series of trajectory points, and can also be an instruction generated when clicking, double-clicking or drawing a chart. That is, the user can click on an icon, write, draw a chart and so on to generate a corresponding touch instruction. The touch instruction in the present embodiments includes, but is not limited to, at least one of a touch instruction generated by writing by the user, a touch instruction generated by clicking or double-clicking by the user, or a touch instruction generated when the user draws a chart. The touch instruction generated by each user operation can be used to determine a corresponding first menu bar.

In implementations, when the user performs the touch operation of writing on the display screen of the display device, a touch instruction is generated at the writing position, and the writing position refers to the touch position of the touch instruction. With the movement of the user's writing position, the corresponding touch position also moves therewith. The display position of the first menu bar corresponding to the current touch instruction is determined according to the current touch position. In the writing process, the first menu bar on the display screen also changes with the writing trajectory. When touch instructions generated by a plurality of users are detected, it indicates that there may be a plurality of persons writing in the conference scenario. For each user, the touch instruction generated in the writing process of the each user corresponds to a first menu bar. When a plurality of users write simultaneously, the first menu bar corresponding to each user is displayed at a position corresponding to the writing position of the user. The display position of the first menu bar of each user is determined according to a touch position of a touch instruction generated by the each user in the writing process. Therefore, no matter one or a plurality of users use the display device to perform touch operation, for the trajectory written by the user, a first menu bar is displayed in the vicinity of the current writing position of the user, which is convenient for the user to perform corresponding operations on icons in the first menu bar.

In some embodiments, the present embodiments generate the display content according to the touch instruction. The display content includes, but is not limited to, text, charts, etc. The first menu bar in the present embodiments is used to edit the display content.

In some embodiments, icons in the first menu bar in the present embodiments may be used to edit the written content, include, but are not limited to, at least one of the color of the display content, the thickness of lines, font type, font size, line spacing, bolding, underlining, adding a corner mark, zooming in/out, adding a mark, modifying, copying, and pasting. In implementations, when the user uses the stylus to write on the display device, the display content corresponding to the user's writing can be edited through the first menu bar to change the color of the display content.

The editing of the display content includes, but is not limited to, the editing of writing parameters before writing (for example, setting of parameters of a stylus), editing the displayed content during and after writing, such as modifying the color, line type, line thickness, bolding, zooming in, zooming out, etc., of the displayed content.

Figure 2:
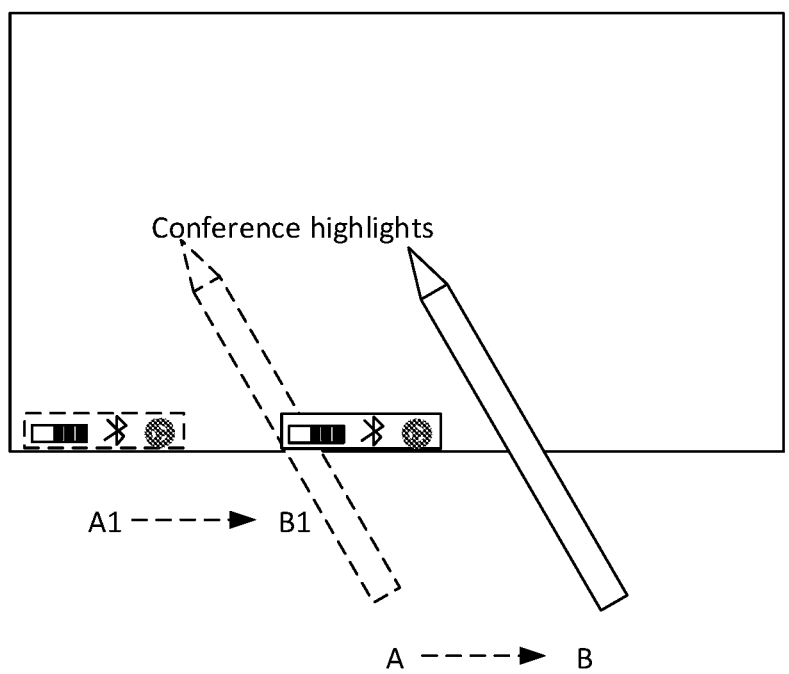
FIG. 2 is a schematic diagram of displaying a menu bar during an operation process of a user according to an embodiment of the present disclosure.

As shown in FIG. 2, the present embodiments provide a schematic diagram of displaying a first menu bar during an operation process of a user. When a user moves from a position A to a position B during a writing operation on the display screen of the display device, a display position of the first menu bar is moved from a position A1 to a position B1, so that when a user writes on the large-size display screen, the corresponding operation can be performed on icons in the first menu bar more conveniently.

Figure 3:
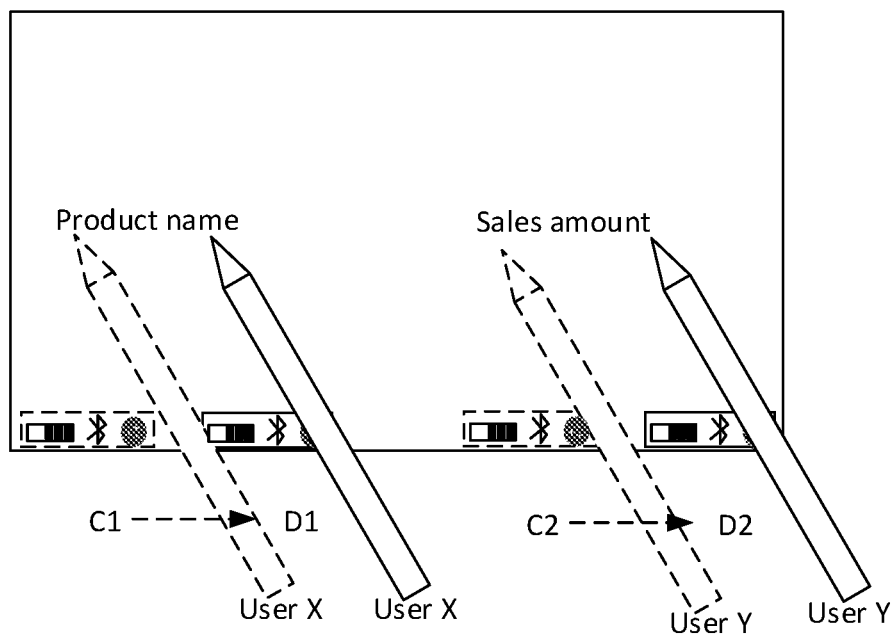
FIG. 3 is a schematic diagram of displaying menu bars during operation processes of a plurality of users according to an embodiment of the present disclosure.

As shown in FIG. 3, the present embodiments provide a schematic diagram of displaying first menu bars during operation processes of a plurality of users. For ease of explanation, in the figure, the process of two users performing the writing operation simultaneously is taken as an example. A corresponding first menu bar is moved from a display position C1 to a position D1 during the writing process of the user X, a corresponding first menu bar is moved from a display position C2 to a position D2 during the writing process of the user Y. The example in the present embodiments can also be applied to a process in which three or more users perform a writing operation simultaneously.

In some embodiments, the present embodiments may further generate a plurality of first menu bars, and the plurality of the first menu bars are located at different positions of the display screen.

In some embodiments, when touch instructions generated by a plurality of users are received, a plurality of first menu bars are generated. The touch instructions generated by the users are in one-to-one correspondence with the first menu bars. Display positions of the first menu bars corresponding to the touch instructions generated by different users are different. Therefore, when different users write simultaneously, the first menu bars are correspondingly displayed according to different writing positions of respective users, which is convenient for each user to operate the first menu bar, and the conference efficiency is improved.

When there is a case where a plurality of users operate the display screen simultaneously, the present embodiments further provide a method for distinguishing touch instructions of a plurality of users, which includes following steps.

When the display device detects a plurality of touch instructions, in this case, it cannot be determined whether the detected plurality of touch instructions are generated by the same user or by different users. A difference in detection time between detected adjacent touch instructions in terms of detection time, and a distance between touch positions of the adjacent touch instructions may be determined first. When the difference is less than a time threshold and the distance is greater than a distance threshold, it is determined that touch instructions of a plurality of users are detected.

In some embodiments, when two or more touch instructions are detected simultaneously, a distance between touch positions of any two touch instructions is determined, and when the distance is greater than a distance threshold, it is determined that a plurality of touch instructions of a plurality of users are detected. When three touch instructions (A, B, C) are detected simultaneously, among the three touch instructions, distances between touch positions of different touch instructions are determined, that is, a distance AB between A and B is determined, a distance AC between A and C is determined, a distance BC between B and C is determined. When AB is greater than the distance threshold, it indicates that A and B may be touch instructions of two users. When AB is not greater than the distance threshold, it indicates that A and B are touch instructions of one user.

It is easy to understand that when a plurality of touch instructions are generated by the same user, then according to the writing rule of the user, a distance between touch positions of adjacent touch instructions is small, and a determination condition that a plurality of users generate the touch instructions is not satisfied. When the touch instructions are generated by a plurality of users, then a distance between touch positions of touch instructions generated by different users must be greater than the distance threshold, and because it is often a case that different user are writing simultaneously, the difference between the detection time of the detected adjacent touch instructions must be less than the time threshold, and it may be determined that the touch instructions received in this case are different touch instructions generated by different users.

In some embodiments, touch instructions generated by a plurality of users in the present embodiments may be touch instructions generated by simultaneous writing operations of a plurality of users, or, touch instructions generated by alternate writing operations of a plurality of users. In the present embodiments, the touch instruction generated by a single user and the touch instructions generated by a plurality of users can be distinguished through the above determination method.

In some embodiments, the touch instruction generated by the user in the present embodiments includes, but is not limited to, any one or more of the following.

One is that the touch instruction includes an instruction generated by a user using a stylus to touch a display screen of the display device.

The other one is that the touch instruction includes an instruction generated by a finger of a user touching a display screen of the display device.

It should be noted that for a touch instruction generated by each user, the principle of the display method of the corresponding first menu bar is the same, and the display of first menu bars corresponding to the touch instructions generated by different users can be implemented based on the same principle. Taking the display of a first menu bar corresponding to a touch instruction generated by a user as an example, the display method of the first menu bar in the present embodiments will be described in detail.

In the display method of the first menu bar in the present embodiments, first menu bars can be displayed in different regions divided for the display screen based on a plurality of regions divided in advance for the display screen of the display device. With the movement of the touch position, a region of the displayed first menu bar is determined according to the region where the touch position is located. Alternatively, there may be no region division, and real-time following method is adopted. That is, the display position of the first menu bar is determined according to the current touch position. An implementation includes, but is not limited to, following two embodiments.

In a first embodiment, a display position is determined according to a region where a touch position is located.

In implementations, the display screen of the display device may be divided into a plurality of regions in advance. The division here is not a real physical division, but a concept of division derived to illustrate how to determine the display position. In the actual implementations, the user will not perceive whether the display screen is divided and how may parts the display screen is divided into. After a plurality of regions divided for a display device are determined in advance, a region where the touch position of the touch instruction is located is determined from a plurality of regions divided for a display screen of that display device, and a display position of the first menu bar corresponding to the touch instruction is determined in the region where the touch position is located.

Figure 4A:
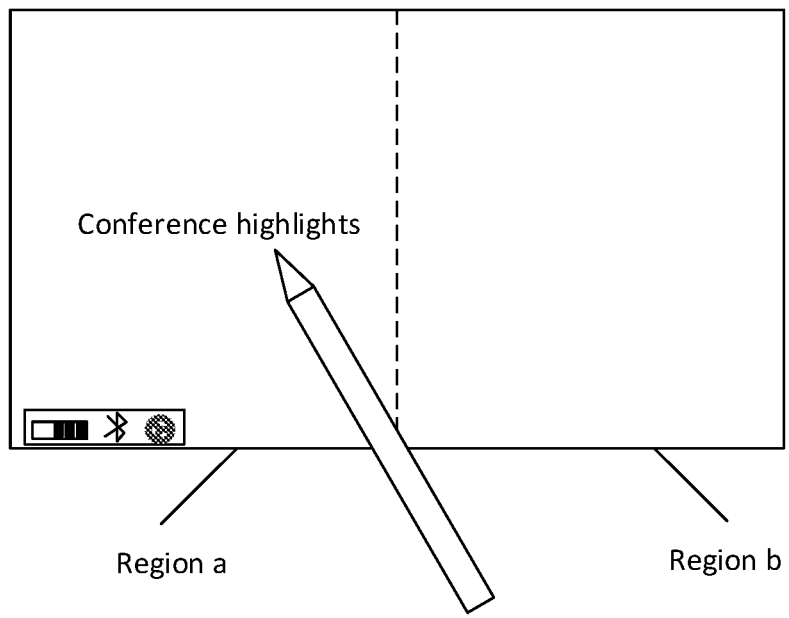
FIG. 4A is a schematic diagram of a first kind of display position of a menu bar according to an embodiment of the present disclosure.
Figure 4B:
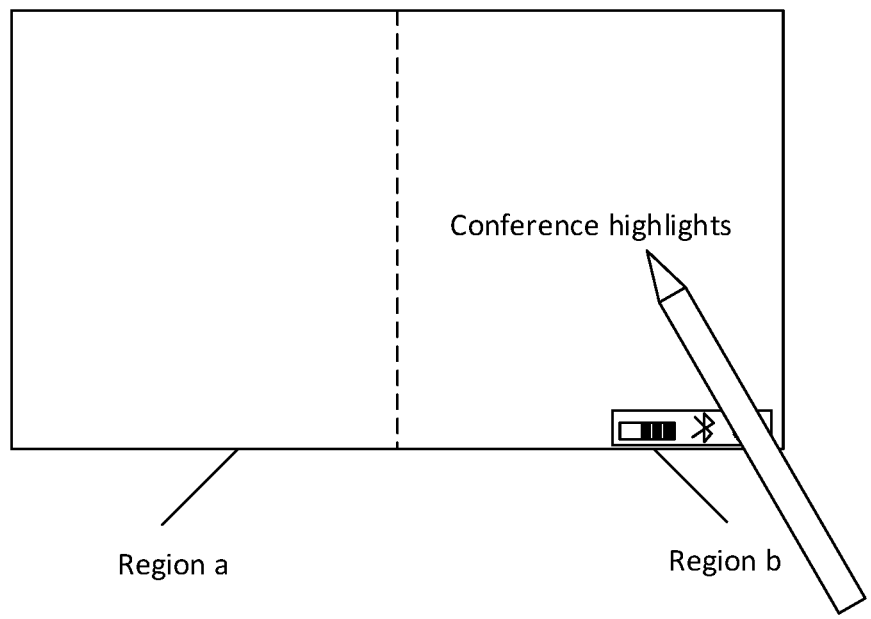
FIG. 4B is a schematic diagram of a second kind of display position of a menu bar according to an embodiment of the present disclosure.

In a case where the display screen of the display device in the present embodiments is divided into two regions of left and right, as shown in FIG. 4A, the present embodiments provide a schematic diagram of a display position of a first menu bar. When a user moves to a region 'a' to write, a touch position of a generated touch instruction is also located in the region 'a', and the first menu bar is displayed below in the region 'a'. Similarly, as shown in FIG. 4B, when the user moves to a region 'b' to write, a touch position of a generated touch instruction is also located in the region 'b', and the first menu bar is displayed on the right in the region 'b'.

Figure 5A:
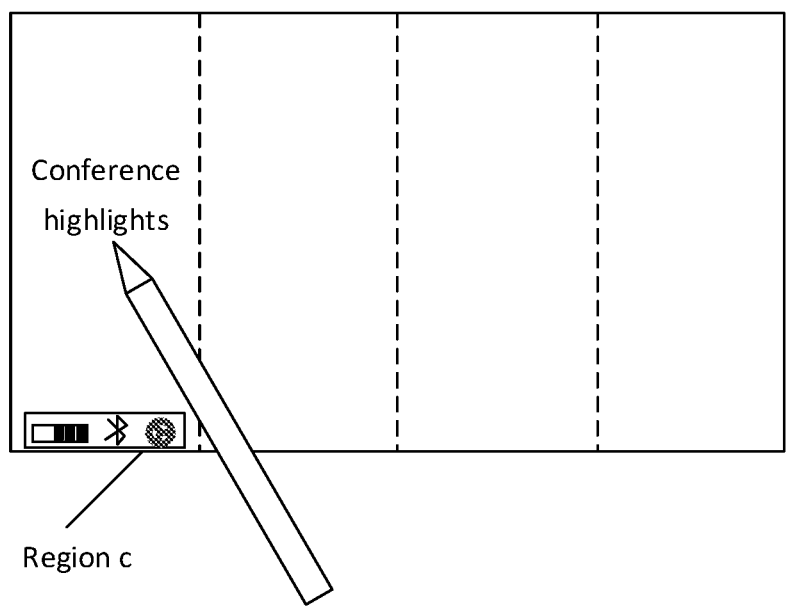
FIG. 5A is a schematic diagram of a third kind of display position of a menu bar according to an embodiment of the present disclosure.
Figure 5B:
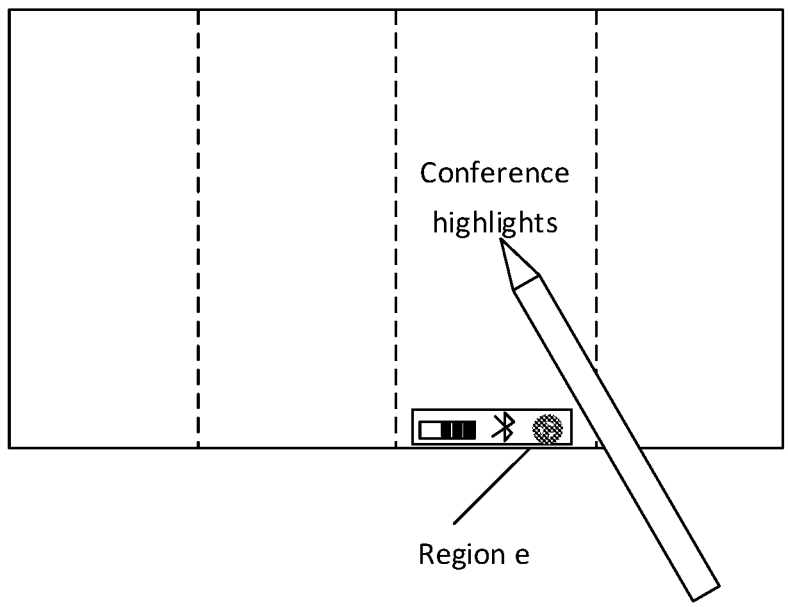
FIG. 5B is a schematic diagram of a fourth kind of display position of a menu bar according to an embodiment of the present disclosure.

In a case where the display screen of the display device in the present embodiments is divided into four regions, as shown in FIG. 5A, the present embodiments provides a schematic diagram of a display position of a first menu bar. When the user moves to a region 'c' to write, a touch position of a generated touch instruction is also located in the region 'c', and the first menu bar is displayed below in the region 'c'. Similarly, as shown in FIG. 5B, when the user moves to a region 'e' to write, a touch position of a generated touch instruction is also located in the region 'e', and the first menu bar is displayed below in the region 'e'.

Optionally, after the region where the touch position is located is determined, the region where the display position of the first menu bar is located is determined. That is, the first menu bar and the touch position are located in the same region. In the same region, the position where the first menu bar is located includes, but is not limited to, a lower side, a left side, a right side, an upper side, or a position different from the touch position in the region, which may be set according to actual requirements, and the present embodiment does not limit it too much.

In a second embodiment, a display position is determined according to a touch position.

A touch position of a touch instruction on a display screen of the display device is determined. A display position of a first menu bar of a stylus is determined within a preset region centering on the touch position.

In the embodiments, the first menu bar continuously moves according to the movement of the touch position of the touch instruction. The first menu bar is located in a preset region with the touch position as the center. The preset region includes at least one of a circular region, a square region or a polygonal region. For example, the first menu bar is located on a circumference, a box, or the like with the touch position as the center, so that the user can conveniently operate the chart in the first menu bar in the writing process, improving the use experience of the user, and improving the conference efficiency.

Figure 6:
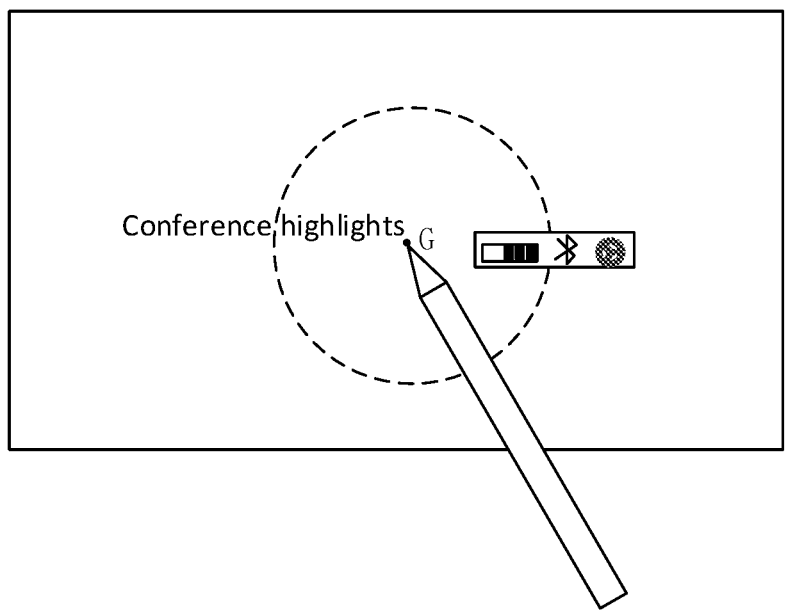
FIG. 6 is a schematic diagram of a fifth kind of display position of a menu bar according to an embodiment of the present disclosure.

As shown in FIG. 6, the present embodiments provide a schematic diagram of a display position of a menu bar. A touch position of a touch instruction generated by a user is G, and a first menu bar is displayed on a circumference with G as the center and a preset radius as the radius.

It should be noted that when there are a plurality of users writing simultaneously, and preset ranges corresponding to touch positions of touch instructions generated by a plurality of users are overlapped, first menu bars respectively corresponding to the touch instructions generated by respective users are not overlapped.

In some embodiments, before the user generates the touch instruction, the present embodiments further provide a method for activating display of the first menu bar, and the core idea is to activate the display of the first menu bar using an activation instruction generated by the user. That is, to determine an initial display position of the first menu bar to display. In implementations, the initial display position of the first menu bar in the present embodiments is determined according to an activation position corresponding to the activation instruction, and the activation instruction is issued by the user. The activation position is essentially related to the user's position when the user issues the activation instruction. Therefore, the initial display position of the first menu bar in the present embodiments is related to the user's position, so that the initial display position is close to the user's position, and it is convenient for the user to preform relevant operations on icons in the first menu bar.

In implementations, before determining the display position of the first menu bar corresponding to the touch instruction according to the touch position of the touch instruction, in the present embodiments, the initial display position of the first menu bar may be determined according to the activation instruction generated by the user as follows.

In response to an activation instruction generated by at least one user, an initial display position of a first menu bar corresponding to the activation instruction is determined according to an activation position corresponding to the activation instruction. The first menu bar corresponding to the activation instruction is displayed at the initial display position.

When only one user performs touch operation at present, then in response to an activation instruction generated by the user, the initial display position is determined according to the activation position, so that the use experience of the user is improved, and the user can conveniently set the displayed first menu bar according to the writing preference of the user before writing, improving the use experience of the user.

In some embodiments, the activation instruction includes any one or more of the following types.

First type: the activation instruction includes an instruction generated when the user removes a stylus from the display device.

It should be noted that in this way, when two or more styluses are removed from the display device simultaneously, then the generated activation instructions represent activation instructions generated by a plurality of users.

Second type: the activation instruction includes an instruction generated when a finger of the user contacts the display screen of the display device and received for a first time after startup.

In this way, when instructions generated by fingers of a plurality of users touching the display screen of the display device are received, then the generated activation instructions are activation instructions generated by a plurality of users.

In some embodiments, the present embodiments determine the initial display position of the first menu bar corresponding to the activation instruction through any one of following methods.

Method 1: The Activation Instruction is Related to the Stylus.

In implementations, the activation instruction is an instruction generated when the user removes the stylus from the display device, then the activation position corresponding to the activation instruction is the position where the stylus is placed outside the display device.

When the activation position is the position where the stylus is placed outside the display device, an initial display position of the first menu bar is determined in a region at a side of a display screen of the display device immediately adjacent to the activation position, which includes, but is not limited to, any one or more of following cases.

Figure 7A:
FIG. 7A is a schematic diagram of a first kind of initial display position of a menu bar according to an embodiment of the present disclosure.

Case 1) when the activation position is a position where the stylus is placed at a left outer side of the display device, an initial display position of the first menu bar is determined in a left region of the display screen immediately adjacent to the activation position. As shown in FIG. 7A, when the user removes the stylus from the left outer side of the display device, the first menu bar is displayed in the left region of the display screen of the display device.

Figure 7B:
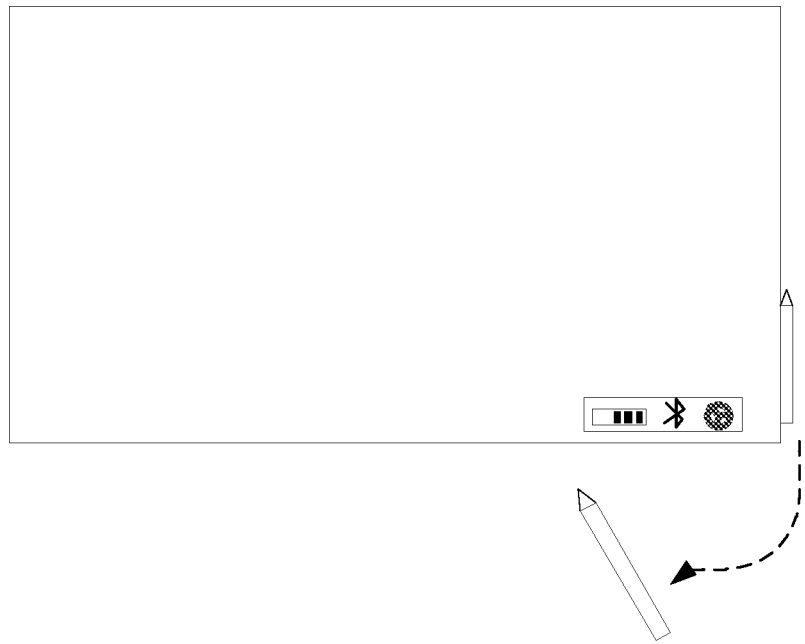
FIG. 7B is a schematic diagram of a second kind of initial display position of a menu bar according to an embodiment of the present disclosure.

Case 2) when the activation position is a position where the stylus is placed at a right outer side of the display device, an initial display position of the first menu bar is determined in a right region of the display screen immediately adjacent to the activation position. As shown in FIG. 7B, when the user removes the stylus from the right outer side of the display device, the first menu bar is displayed in the right region of the display screen of the display device.

Figure 7C:
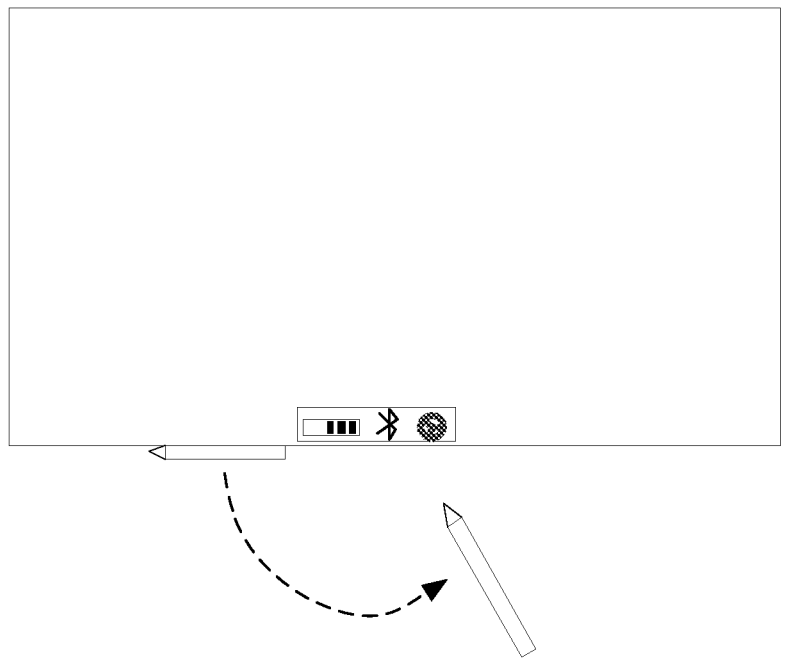
FIG. 7C is a schematic diagram of a third kind of initial display position of a menu bar according to an embodiment of the present disclosure.

Case 3) when the activation position is a position where the stylus is placed at a lower outer side of the display device, an initial display position of the first menu bar is determined in a lower region of the display screen immediately adjacent to the activation position. As shown in FIG. 7C, when the user removes the stylus from the lower outer side of the display device, the first menu bar is displayed in the lower region of the display screen of the display device.

Figure 7D:
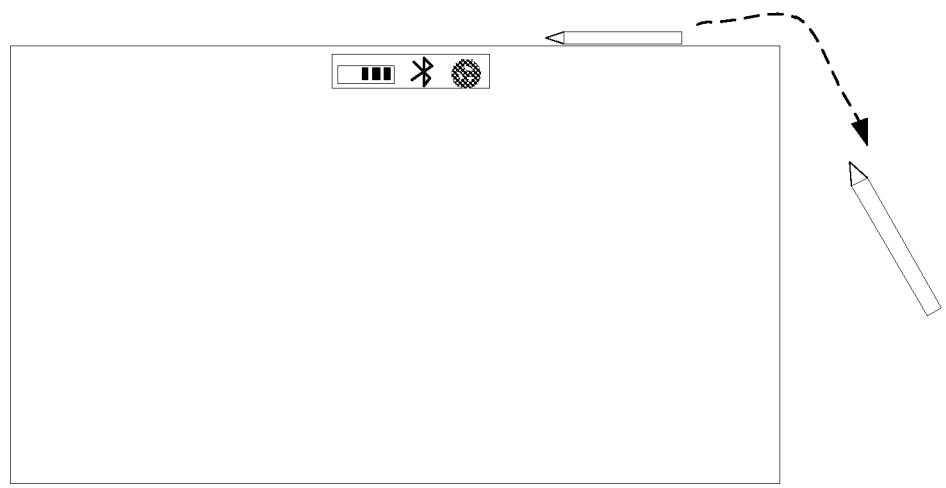
FIG. 7D is a schematic diagram of a fourth kind of initial display position of a menu bar according to an embodiment of the present disclosure.

Case 4) when the activation position is a position where the stylus is placed at an upper outer side of the display device, an initial display position of the first menu bar is determined in an upper region of the display screen immediately adjacent to the activation position. As shown in FIG. 7D, when the user removes the stylus from the upper outer side of the display device, the first menu bar is displayed in the upper region of the display screen of the display device.

In some embodiments, an outer side of the display device includes at least two positions for placing styluses. The processor is configured to perform:
  determining the activation position corresponding to the activation instruction to be one of the at least two positions for placing the styluses; determining the initial display position of the first menu bar in a region at a side of the display screen of the display device adjacent to the activation position.

In implementations, when two styluses are placed outside the display device, then the display device is divided into two regions (a first region and a second region). One region represents an adjacent region adjacent to a position of the stylus (activation position), and the other region represents a distant region distant from the position of the stylus (activation position). When the two styluses are placed at the same position, then the initial display position of the first menu bar is located in the vicinity of the position of the styluses. When the two styluses are not placed at the same position, a first stylus is placed at a side adjacent to the first region, and a second stylus is placed at a side adjacent to the second region, then the initial display position of the first menu bar of the first stylus is located in the first region, and the initial display position of the first menu bar of the second stylus is located in the second region. When three styluses are placed outside the display device, a first stylus, a second stylus and a third stylus are respectively placed at a first position, a second position and a third position, then the display device may be divided into three regions, where a first region is adjacent to the first position, a second region is adjacent to the second position, and a third region is adjacent to the third position, the initial display position of the first menu bar of the first stylus is located in the first region, the initial display position of the first menu bar of the second stylus is located in the second region, and the initial display position of the first menu bar of the third stylus is located in the third region. When more than three styluses are placed outside the display device, then the initial display position of the first menu bar corresponding to each stylus can also be determined according to the above method, which is not limited in the embodiments.

Method 2: The Activation Instruction is Related to the User.

In implementations, the activation instruction is an instruction generated when a finger of the user contacts the display screen of the display device and received for a first time after startup, the activation position corresponding to the activation instruction is a position on the display screen of the display device.

When the activation position is a position on the display screen of the display device, an initial display position of the first menu bar is determined in a region of the display screen including the activation position, where the display screen includes a plurality of divided regions.

Figure 8A:
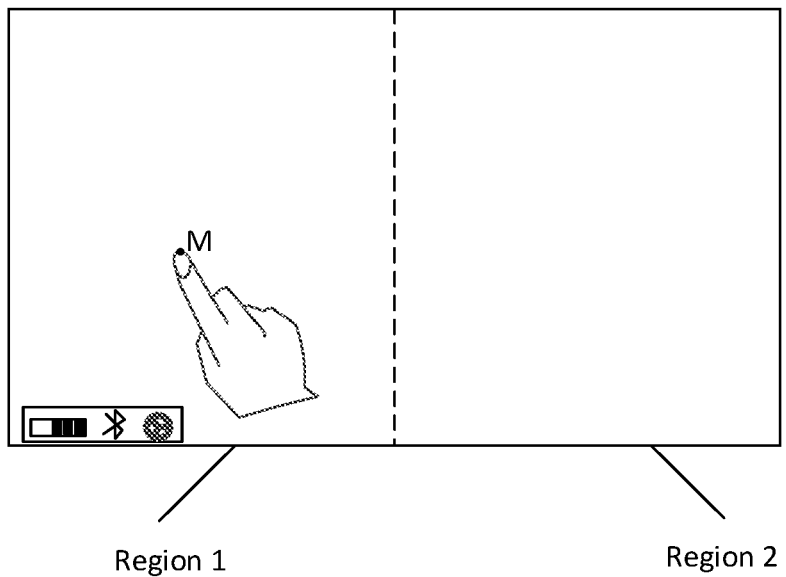
FIG. 8A is a schematic diagram of a fifth kind of initial display position of the menu bar according to an embodiment of the present disclosure.

As shown in FIG. 8A, the display screen is divided into two regions, a region 1 and a region 2. When the user manually triggers the display screen at a position M in the region 1 of the display screen for the first time after startup, the first menu bar is displayed in the region 1. In the present embodiments, the position where the first menu bar is displayed in the region 1 is not limited too much, and can be determined according to actual requirements.

Figure 8B:
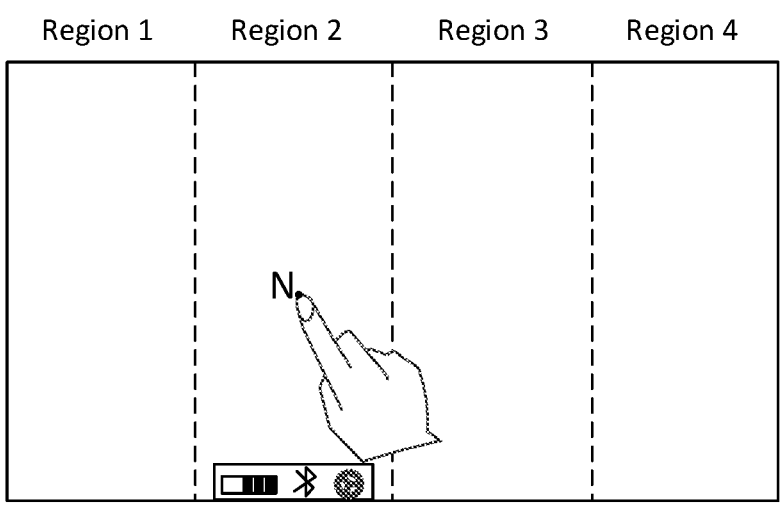
FIG. 8B is a schematic diagram of a sixth kind of initial display position of a menu bar according to an embodiment of the present disclosure.

As shown in FIG. 8B, the display screen is divided into four regions, a region 1, a region 2, a region 3, and a region 4. When the user manually triggers the display screen for the first time at a position N in the region 2 of the display screen after startup, the first menu bar is displayed in the region 2. In the present embodiments, the position where the first menu bar is displayed in the region 2 is not limited too much, and can be determined according to actual requirements.

Figure 8C:
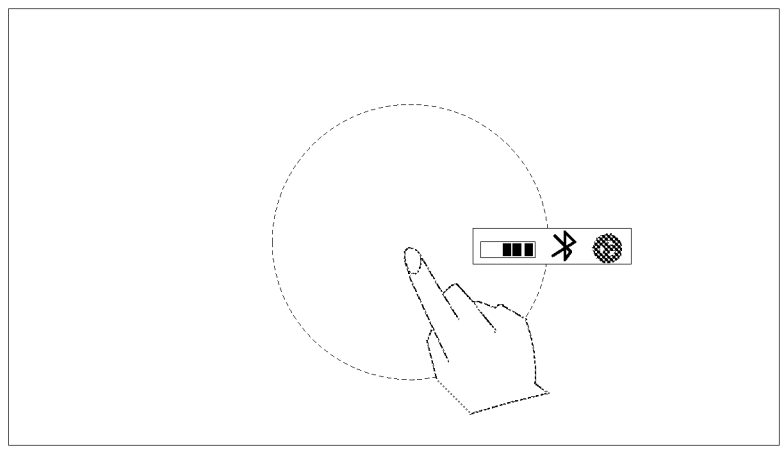
FIG. 8C is a schematic diagram of a seventh kind of initial display position of a menu bar according to an embodiment of the present disclosure.

As shown in FIG. 8C, the user manually triggers the display screen at a certain position in the display screen for the first time after startup, the first menu bar is displayed on a circumference centered on the position.

Figure 9:
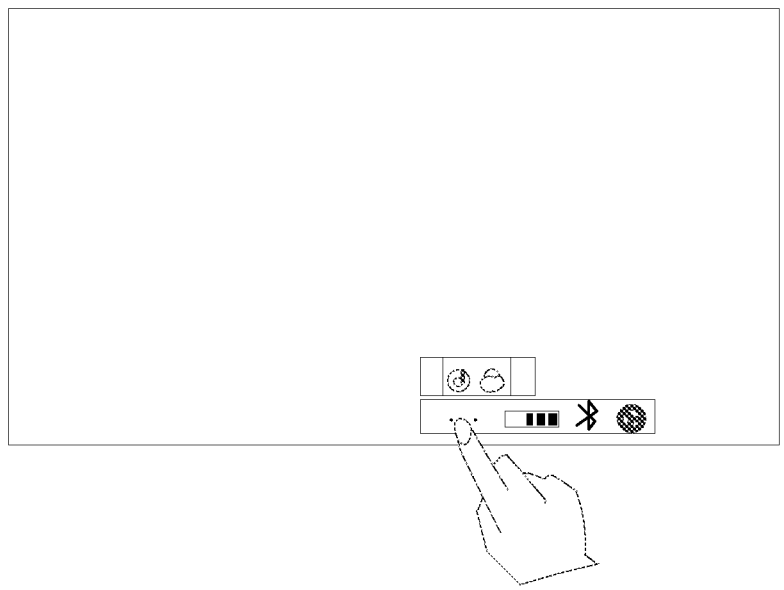
FIG. 9 is a schematic diagram of display of icons of a menu bar according to an embodiment of the present disclosure.

In some embodiments, as shown in FIG. 9, the first menu bar displayed on the display screen of the display device in the present embodiments include, but is not limited to, at least one icon and an extension icon. The extension icon is used for displaying icons in the first menu bar after receiving an expansion instruction.

In some embodiments, the present embodiments may also display a second menu bar. The second menu bar may be displayed after startup, or may be displayed after receiving a touch instruction for the first time, or may be displayed after receiving the activation instruction of the user, which is not limited in the present embodiments. The content displayed by the second menu bar in the present embodiments is different from that of the first menu bar. The first menu bar is used for editing the display content, and the second menu bar is used for providing additional functions, such as modifying the overall background of the display screen, switching the color of the background, switching the display mode, and providing the function of scanning and saving. For example, when the function of scanning and saving in the second menu bar is clicked, a two-dimensional code is displayed on the display screen, so that a user terminal can upload currently displayed content to the user terminal by scanning the two-dimensional code.

In implementations, after the initial display of the second menu bar, the position of the second menu bar on the display screen is fixed.

In some embodiments, after displaying the first menu bar and the second menu bar simultaneously, the first menu bar and the second menu bar are controlled to be fused into one menu bar within at least one set range centering on a touch position of a touch instruction generated by a user. In practice, when the user's writing moves to the vicinity of the second menu bar (the second menu bar is within a set range centering on the touch position of the touch instruction generated by the user), in this case, the first menu bar and the second menu bar are controlled to be combined into one menu bar. It should be noted that, the combination in the present embodiments refers to combining icons in the first menu bar and icons in the second menu bar to generate a new menu bar. The icons in the first menu bar and the icons in the second menu bar may be simultaneously displayed in the new menu bar.

In some embodiments, the icons in the first menu bar in the present embodiments may be used to edit the written content, including but not limited to modifying, copying, pasting, font setting, font color setting, line thickness setting, displayed font size, line spacing, etc. The second menu bar may make various settings for the display device and/or the display screen, including but not limited to background, picture brightness, etc., and can also provide the function of scanning and saving. The functions involved in the first menu bar are not limited too much in the present embodiments. The number, function, size and the like of the icons included in the first menu bar are not limited too much, and can be determined according to actual requirements.

In some embodiments, the present embodiments may also set the first menu bar to disappear after it is determined that there is no operation by the user, so that the first menu bar can be automatically opened (that is, the first menu bar is displayed) and automatically closed (that is, the first menu bar is controlled to disappear), providing a method in which a user does not need to manually open and close the first menu bar, and improving the use experience of the user.

In implementations, whether the first menu bar is closed or not is determined by any one or more of following determination methods.

(1) When the touch instruction is not detected again within a preset time period after the touch instruction is detected, the first menu bar corresponding to the touch instruction is controlled to disappear from the display screen.

In implementations, when the user does not operate the display screen for a long time after writing, the first menu bar corresponding to the touch instruction generated by the user is controlled to disappear from the display screen.

(2) When a difference in detection time between adjacent touch instructions is larger than a preset value, the first menu bar corresponding to the touch instruction with earlier detection time is controlled to disappear from the display screen.

In implementations, when the time difference between touch instructions generated by the user writing twice is large, the first menu bar corresponding to the touch instruction with earlier time is controlled to disappear from the display screen, and only the first menu bar corresponding to the touch instruction of the latest time is displayed.

(3) When a return instruction generated when a stylus is placed back on the display device is detected, the first menu bar corresponding to the touch instruction generated by the stylus is controlled to disappear from the display screen.

In implementations, when the user puts the stylus back on the display device after finishing writing with the stylus, the first menu bar corresponding to the touch instruction generated by the stylus is controlled to disappear from the display screen.

In some embodiments, the present embodiments provide an implementation flow of displaying the first menu bar in a case that the user is not writing. In implementations, the user can use the stylus to write, draw and the like at will on an electronic whiteboard interface of the display device, and operates the displayed first menu bar. The stylus can be attached to one side of the left side, the right side, the upper side and the lower side of the display device, and the display device allows two or more styluses to be used simultaneously.

When the stylus is attached to the right side of the display device, when the user removes the stylus from the right side, at this time, the display device detects an instruction (i.e., an activation instruction) generated when the stylus is removed from the right side, a first menu bar corresponding to the stylus on the right side of the display device is displayed, where a display position of the first menu bar may be at the lower right side. Optionally, it may be set in advance that when an activation instruction is detected, the first menu bar is fixed at a preset position of the display screen for display.

When the stylus is attached to the left side of the display device, when the user removes the stylus from the left side, at this time, the display device detects an instruction (i.e., an activation instruction) generated when the stylus is removed from the left side, a first menu bar corresponding to the stylus on the left side of the display device is displayed, where a display position of the first menu bar may be at the lower left side. Optionally, it may be set in advance that when an activation instruction is detected, the first menu bar is fixed at a preset position of the display screen for display.

In some embodiments, the present embodiments further provide an implementation flow of displaying the first menu bar in a case that the user is writing. In implementations, the user can use the stylus to write, draw and the like at will on an electronic whiteboard interface of the display device, and operates the displayed first menu bar. The display device allows two or more styluses to be used simultaneously. In a case that the user is writing, the present embodiments mainly provide two methods of displaying the first menu bar. One is that in a plurality of regions divided for the display screen, with the movement of the region of the user's writing trajectory in the display screen, the first menu bar also moves in the corresponding region, and the other is that the first menu bar moves with the movement of the user's writing trajectory. No matter which display method is adopted, the first menu bar can move along with the movement of the user, which is more convenient for the user to operate the first menu bar.

In some embodiments, the present embodiments further provide a multi-user writing situation, where the user can independently select to enter a multi-person writing mode in an electronic whiteboard interface, and can also activate the multi-person writing mode by removing the stylus before the user enters the writing mode. The activation is as follows.

(1) When two styluses are attached to a display device, when users take off the two styluses simultaneously, the display device determines that activation instructions generated by two users are received, and the multi-person writing mode is automatically activated, entering the case of multi-person writing, at this time, first menu bars corresponding to the two styluses may be displayed on the display screen simultaneously.

(2) When two styluses are attached to a display device, when a time difference between removals of the two styluses by users is less than a threshold value, the display device determines that activation instructions generated by two users are received, and the multi-person writing mode is automatically activated, entering the case of multi-person writing, at this time, first menu bars corresponding to the two styluses may be displayed on the display screen simultaneously.

To sum up, the display method for the first menu bar according to the present embodiments can realize the effect of following the movement of the user in the writing process of the user, so that the user can easily perform related operations on the displayed first menu bar no matter which position the user moves to, improving the use experience of the user, reducing the repeated action of moving back and forth, and improving the conference efficiency.

Based on the same inventive concept, embodiments of the present disclosure further provide a display method for a menu bar, because this method is the method used by the display device in embodiments of the present disclosure, and the principle of solving the problem by the method is similar to that of the display device, implementations of the method can be referred to implementations of the display device, and the repetition is not repeated.

Figure 10:
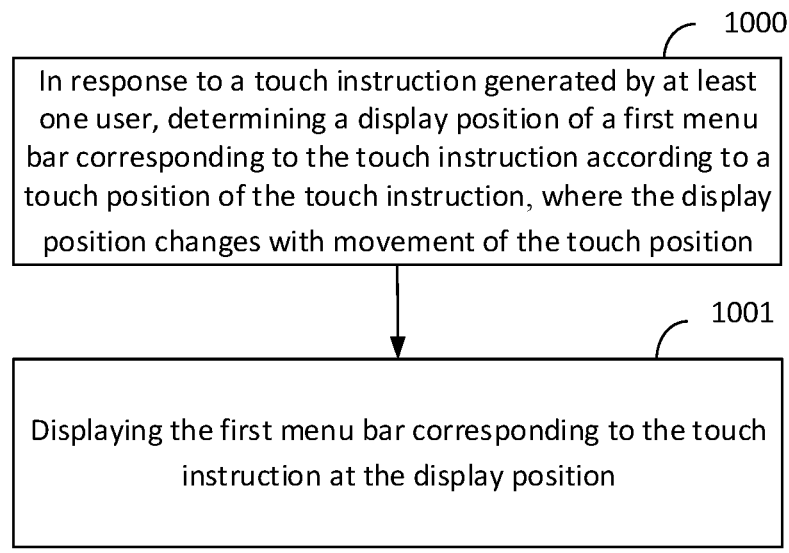
FIG. 10 is an implementation flowchart of a display method for a menu bar according to an embodiment of the present disclosure.

As shown in FIG. 10, the method includes following steps.

Step 1000: in response to a touch instruction generated by at least one user, determining a display position of a first menu bar corresponding to the touch instruction according to a touch position of the touch instruction, where the display position changes with movement of the touch position.

Step 1001: displaying the first menu bar corresponding to the touch instruction at the display position.

As optional embodiments, the method further includes:
generating display content according to the touch instruction, where the first menu bar is used for editing the display content.

As optional embodiments, the touch instruction includes a writing instruction, and the display content includes a writing trajectory.

As optional embodiments, the touch instruction generated by the user is in one-to-one correspondence with the first menu bar, and display positions of first menu bars corresponding to touch instructions generated by different users are different.

As optional embodiments, determining the display position of the first menu bar corresponding to the touch instruction according to the touch position of the touch instruction includes:
determining a region where the touch position of the touch instruction is located from a plurality of regions divided for a display screen of a display device;
determining the display position of the first menu bar corresponding to the touch instruction in the region where the touch position is located.

As optional embodiments, determining the display position of the first menu bar corresponding to the touch instruction according to the touch position of the touch instruction includes:
determining the touch position of the touch instruction on a display screen of a display device;
determining the display position of the first menu bar of a stylus within a preset region centering on the touch position.

As optional embodiments, the touch instruction generated by the user incudes an instruction generated by the user by using a stylus to contact a display screen of a display device; or, the touch instruction includes an instruction generated by a finger of the user contacting the display screen of the display device.

As optional embodiments, the method further includes:
displaying a second menu bar;
controlling the first menu bar and the second menu bar to be combined into one menu bar within at least one set range centering on the touch position.

As optional embodiments, before determining the display position of the first menu bar corresponding to the touch instruction according to the touch position of the touch instruction, the method further includes:
in response to an activation instruction generated by at least one user, determining an initial display position of a first menu bar corresponding to the activation instruction according to an activation position corresponding to the activation instruction;
displaying the first menu bar corresponding to the activation instruction at the initial display position.

As optional embodiments, the activation instruction includes an instruction generated when the user removes a stylus from the display device.

As optional embodiments, the activation instruction includes an instruction generated when a finger of the user contacts the display screen of the display device and received for a first time after startup of the display device.

As optional embodiments, an outer side of the display device includes at least two positions for placing styluses. The determining the initial display position of the first menu bar corresponding to the activation instruction according to the activation position corresponding to the activation instruction includes:
determining the activation position corresponding to the activation instruction to be one of the at least two positions for placing the styluses;
determining the initial display position of the first menu bar in a region at a side of the display screen of the display device adjacent to the activation position.

As optional embodiments, determining the initial display position of the first menu bar corresponding to the activation instruction according to the activation position corresponding to the activation instruction includes:
determining the activation position corresponding to the activation instruction to be a position on the display screen of the display device;

determining the initial display position of the first menu bar in a region of the display screen including the activation position, where the display screen includes a plurality of divided regions.

As optional embodiments, the displayed first menu bar includes at least one icon and an extension icon, and the extension icon is used for displaying icons in the first menu bar after receiving an expansion instruction.

As optional embodiments, the method further includes:
generating a plurality of first menu bars, the plurality of first menu bars being located at different positions of the display screen.

As optional embodiments, the method further includes:
generating a plurality of first menu bars when a plurality of touch instructions are detected.

As optional embodiments, detection of a plurality of touch instructions is determined by:
determining a difference in detection time between adjacent touch instructions in terms of detection time, and a distance between touch positions of the adjacent touch instructions;
when the difference is less than a time threshold and the distance is greater than a distance threshold, determining that a plurality of touch instructions are detected.

As optional embodiments, detection of a plurality of touch instructions is determined by:
determining a distance between touch positions of touch instructions detected simultaneously;
when the distance is greater than a distance threshold, determining that a plurality of touch commands are detected.

As optional embodiments, after displaying the first menu bar corresponding to the touch instruction at the display position, the method further includes:
when the touch instruction is not detected again within a preset time period after the touch instruction is detected, controlling the first menu bar corresponding to the touch instruction to disappear from the display screen; or
when a difference in detection time between adjacent touch instructions is larger than a preset value, controlling the first menu bar corresponding to the touch instruction with earlier detection time to disappear from the display screen; or
when a return instruction generated when a stylus is placed back on the display device is detected, controlling the first menu bar corresponding to the touch instruction generated by the stylus to disappear from the display screen.

Based on the same inventive concept, embodiments of the present disclosure further provide an display apparatus for a menu bar, because this apparatus is the apparatus in the method in embodiments of the present disclosure, and the principle of solving the problem of the apparatus is similar to that of the method, implementations of the apparatus can be referred to implementations of the method, and the repetition is not repeated.

Figure 11:
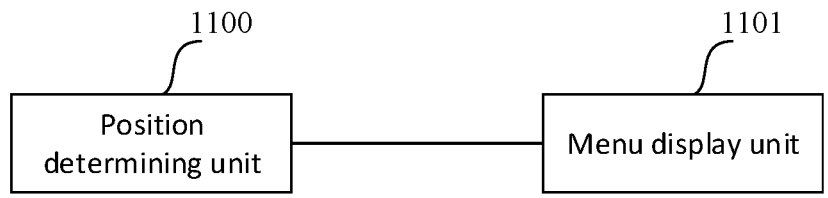
FIG. 11 is a schematic diagram of a display apparatus for displaying a menu bar according to an embodiment of the present disclosure.

As shown in FIG. 11, the apparatus includes:
a position determining unit 1100, configured to in response to a touch instruction generated by at least one user, determine a display position of a first menu bar corresponding to the touch instruction according to a touch position of the touch instruction, where the display position changes with movement of the touch position;

a menu display unit 1101, configured to display the first menu bar corresponding to the touch instruction at the display position.

As optional embodiments, the apparatus further includes a content display unit configured to:
generate display content according to the touch instruction, where the first menu bar is used for editing the display content.

As optional embodiments, the touch instruction includes a writing instruction, and the display content includes a writing trajectory.

As optional embodiments, the touch instruction generated by the user is in one-to-one correspondence with the first menu bar, and display positions of first menu bars corresponding to touch instructions generated by different users are different.

As optional embodiments, the position determining unit 1100 is configured to:
determine a region where the touch position of the touch instruction is located from a plurality of regions divided for a display screen of a display device;
determine the display position of the first menu bar corresponding to the touch instruction in the region where the touch position is located.

As optional embodiments, the apparatus further includes a combination display unit configured to:
display a second menu bar;
control the first menu bar and the second menu bar to be combined into one menu bar within at least one set range centering on the touch position.

As optional embodiments, the position determining unit 1100 is configured to:
determine the touch position of the touch instruction on a display screen of a display device;
determine the display position of the first menu bar of a stylus within a preset region centering on the touch position.

As optional embodiments, the touch instruction generated by the user incudes an instruction generated by the user by using a stylus to contact a display screen of a display device; or, the touch instruction includes an instruction generated by a finger of the user contacting the display screen of the display device.

As optional embodiments, before determining the display position of the first menu bar corresponding to the touch instruction according to the touch position of the touch instruction, the apparatus further includes an activation display unit configured to:
in response to an activation instruction generated by at least one user, determine an initial display position of a first menu bar corresponding to the activation instruction according to an activation position corresponding to the activation instruction;
display the first menu bar corresponding to the activation instruction at the initial display position.

As optional embodiments, the activation instruction includes an instruction generated when the user removes a stylus from the display device.

As optional embodiments, the activation instruction includes an instruction generated when a finger of the user contacts the display screen of the display device and received for a first time after startup.

As optional embodiments, an outer side of the display device includes at least two positions for placing styluses; the activation display unit is configured to:

determine the activation position corresponding to the activation instruction to be one of the at least two positions for placing the styluses;

determine the initial display position of the first menu bar in a region at a side of the display screen of the display device adjacent to the activation position.

As optional embodiments, the activation display unit is configured to:

determine the activation position corresponding to the activation instruction to be a position on the display screen of the display device; determine the initial display position of the first menu bar in a region of the display screen including the activation position, where the display screen includes a plurality of divided regions.

As optional embodiments, the displayed first menu bar includes at least one icon and an extension icon, and the extension icon is used for displaying icons in the first menu bar after receiving an expansion instruction.

As optional embodiments, the position determining unit 1100 is configured to: generate a plurality of first menu bars, the plurality of first menu bars being located at different positions of the display screen.

As optional embodiments, the position determining unit 1100 is configured to:

generate a plurality of first menu bars when touch instructions generated by a plurality of users are received.

As optional embodiments, the position determining unit 1100 is configured to:

generate a plurality of first menu bars when a plurality of touch instructions are detected.

As optional embodiments, the position determining unit 1100 is configured to determine detection of a plurality of touch instructions by:

determining a difference in detection time between adjacent touch instructions in terms of detection time, and a distance between touch positions of the adjacent touch instructions;

when the difference is less than a time threshold and the distance is greater than a distance threshold, determining that a plurality of touch instructions are detected.

As optional embodiments, the position determining unit 1100 is configured to determine detection of a plurality of touch instructions by:

determining a distance between touch positions of touch instructions detected simultaneously;

when the distance is greater than a distance threshold, determining that a plurality of touch commands are detected.

As optional embodiments, after displaying the first menu bar corresponding to the touch instruction at the display position, the apparatus further includes a disappearance control unit configured to:

when the touch instruction is not detected again within a preset time period after the touch instruction is detected, control the first menu bar corresponding to the touch instruction to disappear from the display screen; or when a difference in detection time between adjacent touch instructions is larger than a preset value, control the first menu bar corresponding to the touch instruction with earlier detection time to disappear from the display screen; or when a return instruction generated when a stylus is placed back on the display device is detected, control the first menu bar corresponding to the touch instruction generated by the stylus to disappear from the display screen.

Based on the same inventive concept, embodiments of the present disclosure further provide a computer storage medium storing a computer program thereon, the computer program, when executed by a processor, implements steps of:

in response to a touch instruction generated by at least one user, determining a display position of a first menu bar corresponding to the touch instruction according to a touch position of the touch instruction, wherein the display position changes with movement of the touch position;

displaying the first menu bar corresponding to the touch instruction at the display position.

Those skilled in the art should understand that embodiments of the present application can be provided as methods, systems or computer program products. Therefore, the present application can adopt forms of full hardware embodiments, full software embodiments, or embodiments combining software and hardware aspects. Moreover, the present application can adopt a form of the computer program products implemented on one or more computer available storage mediums (including but not limited to a disk memory, CD-ROM, an optical memory and the like) containing computer available program codes.

The present application is described with reference to flow charts and/or block diagrams of the methods, the devices (systems), and the computer program products according to embodiments of the present application. It should be understood that each flow and/or block in the flow charts and/or the block diagrams and combinations of the flows and/or the blocks in the flow charts and/or the block diagrams can be implemented by computer program instructions. The computer program instructions may be provided to a processor of a general-purpose computer, a special-purpose computer, an embedded processing machine or other programmable data processing device, thereby generating a machine, such that the instructions, when executed by the processor of the computers or other programmable data processing device, generate devices for implementing functions specified in one or more flows in the flow charts and/or one or more blocks in the block diagrams.

The computer program instructions may also be stored in a computer readable memory which can guide the computers or other programmable data processing device to work in a specific mode, thus the instructions stored in the computer readable memory generates an article of manufacture that includes a commander device that implement the functions specified in one or more flows in the flow charts and/or one or more blocks in the block diagrams.

The computer program instructions may also be loaded to the computers or other programmable data processing device, so that a series of operating steps may be executed on the computers or other programmable equipment to generate computer-implemented processing, such that the instructions executed on the computers or other programmable equipment provide steps for implementing the functions specified in one or more flows in the flow charts and/or one or more blocks in the block diagrams.

Although embodiments of the present disclosure have been described, those skilled in the art may otherwise make various modifications and variations to these embodiments once they are aware of the basic inventive concept. Therefore, the claims intend to include embodiments as well as all these modifications and variations falling within the scope of the present disclosure.

Obviously, those skilled in the art can make various modifications and variations to the present application without departing from the spirit and scope of the present application. In this way, when these modifications and variations of the present application fall within the scope of the claims of the present application and their equivalent art, the present application also intends to include these modifications and variations.

What is claimed is:

1. A display device, comprising a display screen and a control circuit, wherein:
   the display screen is configured to display content;
   the control circuit includes a processor and a memory, the memory is configured to store a program executable by the processor, the processor is configured to read the program in the memory and perform following steps:
   in response to a touch instruction generated by at least one user, determining a display position of a first menu bar corresponding to the touch instruction according to a touch position of the touch instruction, wherein the display position changes with movement of the touch position;
   displaying the first menu bar corresponding to the touch instruction at the display position;
   wherein the processor is configured to perform: generating a plurality of first menu bars when a plurality of touch instructions are detected;
   wherein the processor is configured to determine detection of a plurality of touch instructions by:
   determining a difference in detection time between adjacent touch instructions in terms of detection time, and a distance between touch positions of the adjacent touch instructions; when the difference is less than a time threshold and the distance is greater than a distance threshold, determining that a plurality of touch instructions are detected; or,
   determining a distance between touch positions of touch instructions detected simultaneously; when the distance is greater than a distance threshold, determining that a plurality of touch instructions are detected.

2. The display device according to claim 1, wherein the processor is further configured to perform:
   generating display content according to the touch instruction, wherein the first menu bar is used for editing the display content.

3. The display device according to claim 2, wherein the touch instruction comprises a writing instruction, and the display content comprises a writing trajectory.

4. The display device according to claim 1, wherein the processor is configured to perform:
   determining a region where the touch position of the touch instruction is located from a plurality of regions divided for the display screen of the display device;
   determining the display position of the first menu bar corresponding to the touch instruction in the region where the touch position is located.

5. The display device according to claim 1, wherein the processor is configured to perform:
   determining the touch position of the touch instruction on the display screen of the display device;
   determining the display position of the first menu bar of a stylus within a preset range centering on the touch position.

6. The display device according to claim 1, wherein the processor is further configured to perform:
   displaying a second menu bar;
   controlling the first menu bar and the second menu bar to be combined into one menu bar within at least one set range centering on the touch position when the second menu bar is within the at least one set range.

7. The display device according to claim 6, wherein the second menu bar does not change with the movement of the touch position.

8. The display device according to claim 1, wherein before determining the display position of the first menu bar corresponding to the touch instruction according to the touch position of the touch instruction, the processor is further configured to perform:
   in response to an activation instruction generated by at least one user, determining an initial display position of a first menu bar corresponding to the activation instruction according to an activation position corresponding to the activation instruction;
   displaying the first menu bar corresponding to the activation instruction at the initial display position.

9. The display device according to claim 8, wherein the activation instruction comprises an instruction generated when the user removes a stylus from the display device.

10. The display device according to claim 9, wherein an outer side of the display device comprises at least two positions for placing styluses;
    wherein the processor is configured to perform:
    determining the activation position corresponding to the activation instruction to be one of the at least two positions for placing the styluses;
    determining the initial display position of the first menu bar in a region at a side of the display screen of the display device adjacent to the activation position.

11. The display device according to claim 8, wherein the activation instruction comprises an instruction generated when a finger of the user contacts the display screen of the display device and received for a first time after startup of the display device.

12. The display device according to claim 11, wherein the processor is configured to perform:
    determining the activation position corresponding to the activation instruction to be a position on the display screen of the display device;
    determining the initial display position of the first menu bar in a region of the display screen comprising the activation position, wherein the display screen comprises a plurality of divided regions.

13. The display device according to claim 1, wherein the processor is configured to perform:
    generating a plurality of first menu bars, the plurality of first menu bars being located at different positions of the display screen.

14. The display device according to claim 1, wherein after displaying the first menu bar corresponding to the touch instruction at the display position, the processor is further configured to perform:
    when the touch instruction is not detected again within a preset time period after the touch instruction is detected, controlling the first menu bar corresponding to the touch instruction to disappear from the display screen; or
    when a difference in detection time between adjacent touch instructions is larger than a preset value, controlling the first menu bar corresponding to the touch instruction with earlier detection time to disappear from the display screen; or when a return instruction generated when a stylus is placed back on the display device is detected, controlling the first menu bar corresponding to the touch instruction generated by the stylus to disappear from the display screen.

15. The display device according to claim 1, wherein the first menu bar comprises at least one icon and an extension icon, and the extension icon is used for displaying icons in the first menu bar after receiving an expansion instruction.

16. A display method for a menu bar, comprising:

in response to a touch instruction generated by at least one user, determining a display position of a first menu bar corresponding to the touch instruction according to a touch position of the touch instruction, wherein the display position changes with movement of the touch position;

displaying the first menu bar corresponding to the touch instruction at the display position;

wherein the method further comprises: generating a plurality of first menu bars when a plurality of touch instructions are detected;

wherein the method further comprises: determining detection of a plurality of touch instructions by:

determining a difference in detection time between adjacent touch instructions in terms of detection time, and a distance between touch positions of the adjacent touch instructions; when the difference is less than a time threshold and the distance is greater than a distance threshold, determining that a plurality of touch instructions are detected; or, determining a distance between touch positions of touch instructions detected simultaneously; when the distance is greater than a distance threshold, determining that a plurality of touch instructions are detected.

17. A non-transitory computer storage medium storing a computer program thereon, the computer program, when executed by a processor, implementing steps of the method of claim 16.

* * * * *